(12) United States Patent
Swanson et al.

(10) Patent No.: US 8,270,235 B2
(45) Date of Patent: Sep. 18, 2012

(54) DYNAMIC DETECTION OF A STROBE SIGNAL WITHIN AN INTEGRATED CIRCUIT

(75) Inventors: Richard W. Swanson, San Jose, CA (US); Tao Pi, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 195 days.

(21) Appl. No.: 12/794,605

(22) Filed: Jun. 4, 2010

(65) Prior Publication Data

US 2011/0299347 A1 Dec. 8, 2011

(51) Int. Cl.
*G11C 7/00* (2006.01)
(52) U.S. Cl. .............. 365/193; 365/189.05; 365/189.07; 365/189.15; 365/233.1
(58) Field of Classification Search ............... 365/193, 365/189.15, 189.07, 189.05
See application file for complete search history.

(56) References Cited

U.S. PATENT DOCUMENTS

| | | | |
|---|---|---|---|
| 6,807,613 B1 * | 10/2004 | Keeth et al. .................... | 711/167 |
| 7,020,728 B1 | 3/2006 | Jones et al. | |
| 7,167,023 B1 | 1/2007 | Pan et al. | |
| 7,457,175 B1 * | 11/2008 | Griffith et al. ................. | 365/193 |
| 7,898,878 B2 * | 3/2011 | Nguyen et al. ........... | 365/189.07 |
| 7,911,857 B1 * | 3/2011 | Venkataraman et al. | 365/189.15 |
| 7,983,100 B2 * | 7/2011 | Shan et al. ..................... | 365/193 |
| 2011/0063931 A1 * | 3/2011 | Linam et al. ................... | 365/193 |
| 2011/0298511 A1 | 12/2011 | Swanson et al. | |
| 2011/0299351 A1 | 12/2011 | Schultz | |
| 2011/0302356 A1 | 12/2011 | Helton | |

* cited by examiner

*Primary Examiner* — Pho M Luu
(74) *Attorney, Agent, or Firm* — Kevin T. Cuenot

(57) ABSTRACT

A method of processing a strobe signal can include oversampling a strobe signal received from a source synchronous device and determining an amount of time between sending a read request to the source synchronous device and detecting a first pulse of the strobe signal according to the oversampling. The method also can include squelching the strobe signal for the amount of time responsive to at least one subsequent read request.

20 Claims, 4 Drawing Sheets

DYNAMIC DETECTION OF A STROBE SIGNAL WITHIN AN INTEGRATED CIRCUIT

FIELD OF THE INVENTION

One or more embodiments disclosed within this specification relate to integrated circuits (ICs). More particularly, one or more embodiments relate to dynamic detection of a strobe signal within an IC.

BACKGROUND

A device that utilizes a source synchronous interface provides a reference signal along with data sent from the device. The reference signal is generally referred to as a strobe signal or a data strobe (DQS) signal. One example of a source synchronous device is a synchronous dynamic random access memory (SDRAM) device. The reference signal sent from the source synchronous device (source) is used by a receiving device (target) that is coupled to the source. For example, once synchronized, the target can capture data detected on the data lines from the source on the rising and/or the falling edges of the strobe signal.

At times, however, the strobe signal from the source is placed in a tri-state mode. When tri-stated, the target does not utilize the strobe signal. Moreover, the target must prevent the strobe signal sent from the source from propagating to other components or subsystems within the target since the strobe signal is essentially in an unknown or random state. Accordingly, the target must monitor the strobe signal to determine when the strobe signal is no longer tri-stated and has transitioned to providing a valid reference signal.

Determining when the strobe signal is valid within the target, however, can be difficult due to a number of factors that influence the timing of the strobe signal as received within the target. For example, one factor is that the distance traveled by the strobe signal between source and target is not known until the circuit board of a system is designed. Other factors include varying behaviors or performance characteristics of different IC sources and temperature and/or voltage variation in the source, the target, and/or the circuit board upon which the source and/or target are disposed.

SUMMARY

One or more embodiments disclosed within this specification relate to integrated circuits (ICs) and, more particularly, to dynamic detection of a strobe signal within an IC. One embodiment of the present invention can include a method of processing a strobe signal. The method can include oversampling a strobe signal received from a source synchronous device and determining an amount of time between sending a read request to the source synchronous device and detecting a first pulse of the strobe signal according to the oversampling. The strobe signal can be squelched for the amount of time responsive to at least one subsequent read request.

Another embodiment of the present invention can include a system for processing a strobe signal. The system can include a plurality of sampling flip-flops oversampling the strobe signal. Each of the plurality of sampling flip-flops can be clocked by a clock signal having a different phase and approximately a same frequency as a frequency of the strobe signal. The system also can include a controller configured to detect a read request sent to a source synchronous device and determine an amount of time between the read request and a first pulse of the strobe signal according to values received from the plurality of sampling flip-flops oversampling the strobe signal. The system further can include a squelch circuit configured to gate the strobe signal for the amount of time responsive to a subsequent read request.

Another embodiment of the present invention can include a system including a memory controller and a strobe detector coupled to the memory controller. The strobe detector can be configured to determine an amount of time between sending a read request originating from the memory controller to a source synchronous device and detecting a first pulse of a strobe signal received from the source synchronous device. The strobe detector can be configured to gate the strobe signal responsive to at least one subsequent read request from the memory controller for the amount of time.

DETAILED DESCRIPTION OF THE DRAWINGS

While the specification concludes with claims defining the features of one or more embodiments of the invention that are regarded as novel, it is believed that the one or more embodiments of the invention will be better understood from a consideration of the description in conjunction with the drawings. As required, one or more detailed embodiments of the present invention are disclosed herein; however, it is to be understood that the one or more embodiments disclosed are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of one or more embodiments of the invention.

One or more embodiments disclosed within this specification relate to integrated circuits (ICs) and, more particularly, to dynamic detection of a strobe signal within an IC. In accordance with the one or more embodiments disclosed within this specification, a timing relationship can be determined between a control signal and a first pulse of a strobe signal. More particularly, a control signal can be sent from a target to a source synchronous device. Responsive to the control signal, the source synchronous device can begin specifying a reference signal via the strobe signal. The first pulse, for example, on the strobe signal can be detected.

The time that is measured between the control signal and the first pulse can be used to squelch the strobe signal in subsequent transactions. The term "squelch" or "squelching" can refer to pulling a signal either high or low and retaining the signal in that state for a period of time, e.g., the period of time the signal is to be squelched. Whether the signal is pulled high or low can vary according to the configuration of the particular circuit to which the signal is being provided. Accordingly, the strobe signal is effectively gated, using the measured timing relationship, from a time indicated by the control signal to approximately the time when the strobe signal transitions to specifying a reliable reference signal that is usable by the target system communicating with the source synchronous device.

Figure 1:
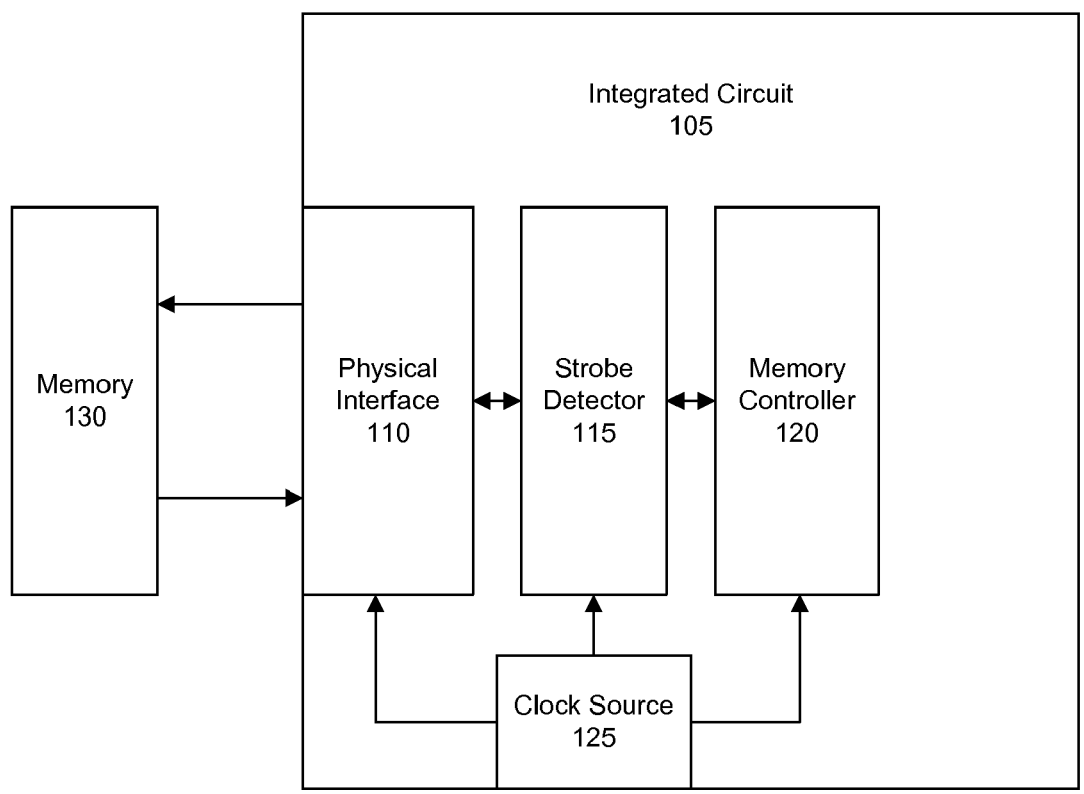
FIG. 1 is a first block diagram illustrating a system for processing a strobe signal in accordance with one embodiment of the present invention.

FIG. 1 is a first block diagram illustrating a system 100 for processing a strobe signal in accordance with one embodiment of the present invention. FIG. 1 illustrates an IC 105 communicating with a source synchronous device such as a memory 130. For example, memory 130 can be implemented as any of a variety of synchronous dynamic random access memory (SDRAM) devices. It should be appreciated that a memory is used within this specification for purposes of illustration. The one or more embodiments disclosed within this specification, can be applied to any of a variety of different source synchronous devices and are not limited to use with a memory.

In one or more embodiments, IC 105 can be implemented as a programmable IC. Programmable ICs are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAMs), multipliers, digital signal processing blocks (DSPs), processors, clock managers, delay lock loops (DLLs), and so forth.

Each programmable tile typically includes both programmable interconnect and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuits are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell. Other programmable ICs are programmed by applying a processing layer, such as a metal layer, that programmably interconnects the various elements on the device. These programmable ICs are known as mask programmable devices.

Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

The one or more embodiments disclosed herein, however, are not intended to be limited to programmable ICs. Rather, IC 105 can be implemented as any of a variety of different ICs. For example, IC 105 can be a processor having an embedded memory controller, an application specific IC, a mixed signal IC, or any of a variety of non-programmable ICs.

As shown, IC 105 can include a physical interface 110, a strobe detector 115, a memory controller 120, and clock source 125. Physical interface 110 can include circuitry such as input/output (I/O) blocks, pins, and the like through which the signals passed between IC 105 and memory 130 are propagated.

Strobe detector 115 can perform a variety of functions relating to alignment and/or detection of signals to facilitate communication between memory controller 120 and memory 130. In one or more embodiments, strobe detector 115 can detect when a read request is initiated, e.g., sent, from memory controller 120 and directed to memory 130. Strobe detector 115 can determine an amount of time between the sending, or initiation, of the read request and the transitioning of the strobe signal from a tri-stated state to one in which a valid reference signal is specified. The strobe signal can be a data strobe signal, also referred to as a DQS signal.

Memory controller 120 can include circuitry configured to read from, and write to, memory 130. For example, when memory 130 is implemented as a dynamic random access memory (DRAM), memory controller 120 can communicate with memory 130 to read from memory 130 or write to memory 130. In that case, memory controller 120 further can include circuitry to "refresh" memory 130 by providing current or power to memory 130.

Clock source 125 can include circuitry configured to generate clock signals that are distributed to each of physical interface 110, strobe detector 115, and memory controller 120. For example, strobe detector 115 can utilize a plurality of different clock signals, where each is phase adjusted to achieve oversampling of a selected signal such as the strobe signal from memory 130. Clock source 125 can generate the requisite clock signals needed by strobe detector 115 to oversample the strobe signal as will be described in greater detail within this specification with reference to the remaining figures. Clock source 125 further can generate the clock signals necessary to drive physical interface 110 and memory controller 120. Clock source 125 can generate the needed signals from one or more received reference clock signal(s) or generate the needed clock signals internally.

In operation, memory controller 120 can initiate a read request that is sent to memory 130 via physical interface 110. In one or more embodiments, the read request can be propagated through strobe detector 115. For example, responsive to receiving the read request from memory controller 120, strobe detector 115 can forward the read request to physical interface 110. In one or more other embodiments, memory controller 120 can send the read request directly to physical interface 110 and provide a copy of the read request to strobe detector 115.

Responsive to determining that a read request has been initiated or sent by memory controller 120, strobe detector 115 can begin monitoring for the occurrence of a first pulse on the strobe signal received from memory 130. In general, when not in use, memory 130 keeps the strobe signal tri-stated. The strobe signal remains in a high impedance state, or "high z" state, until responding to a request, for example, from memory controller 120.

Responsive to the read request, memory 130 can generate and send a preamble on the strobe signal. In one embodiment, the preamble can be defined as pulling the voltage of the strobe signal low for one, or approximately one, clock cycle at the frequency of the reference to be provided by the strobe signal. After the preamble, the strobe signal specifies a first pulse of a series of pulses that form the reference signal to be used by memory controller 120 in reading data received from memory 130.

Strobe detector 115 can be configured to detect the first pulse following the preamble of the strobe signal and, thus, calculate the amount of time between the read request and the detection of the first pulse. The amount of time is the "roundtrip" time between when the read request is sent to memory 130 and the strobe signal from memory 130 begins providing the needed reference signal for acquisition and processing of data from memory 130. Since the strobe signal is tri-stated when the read request is issued, the strobe signal should be prevented from entering systems of IC 105 until the strobe signal has transitioned to providing a reliable reference signal. Thus, the strobe signal can be gated from the time the read request is sent until approximately the first pulse is received following the preamble.

In general, strobe detector 115 can squelch, e.g., suppress, the strobe signal responsive to detecting the read request and stop gating the strobe signal after the measured amount of time has passed, e.g., the amount of time between a prior read request and the first pulse following the prior read request. Gating can be performed using prior measured values in a prospective manner.

For example, the amount of time between the read request and the first pulse following the read request can be determined responsive to each read request. The amount of time calculated responsive to each read request can be used in squelching the strobe signal for the following, or subsequent, read request. Thus, the duration of the squelching performed by strobe detector 115 can be continually updated to account for changes in the timing of the strobe signal that can result from variation in temperature and/or voltage.

In one or more embodiments, strobe detector 115 can be incorporated within physical interface 110. For example, strobe detector 115 can be disposed within an input/output bank of IC 105. In one or more other embodiments, clock source 125 also can be disposed with physical interface 110. For example, clock source 125 can be disposed within an input/output bank of IC 105.

Figure 2:
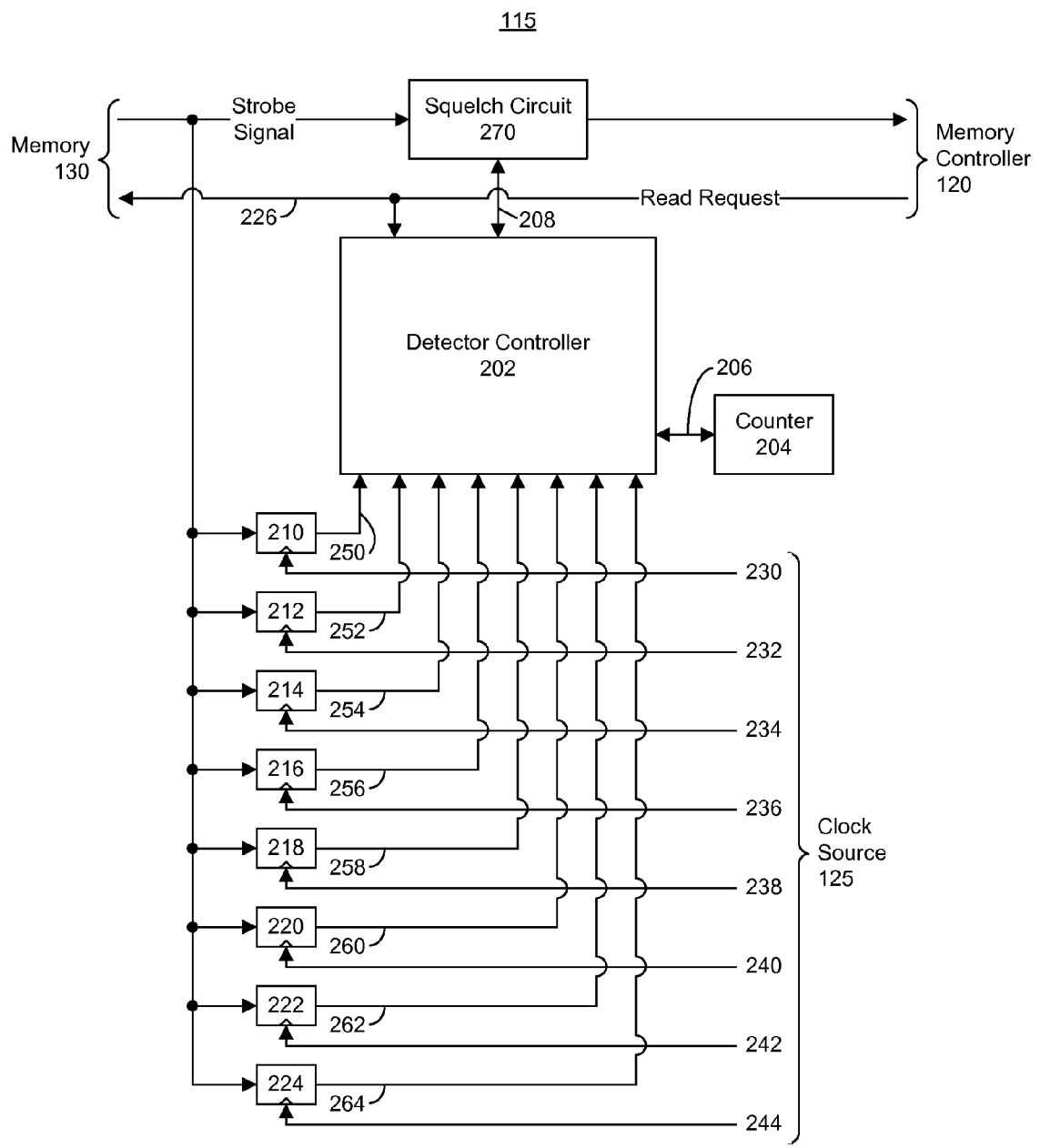
FIG. 2 is a second block diagram illustrating a strobe detector in accordance with another embodiment of the present invention.

FIG. 2 is a second block diagram illustrating a strobe detector in accordance with another embodiment of the present invention. More particularly, FIG. 2 illustrates strobe detector 115 described with reference to FIG. 1. As shown, strobe detector 115 can include a detector controller 202, a counter 204, a plurality of sampling flip-flops (FFs) 210-224, and a squelch circuit 270.

Detector controller 202 is coupled to counter 204 via signal 206. Through signal 206, detector controller 202 can start counter 204, stop counter 204, read the counter value stored within counter 204, and/or reset counter 204. In one or more embodiments, counter 204 can be configured to operate at approximately eight times the frequency of the signal being monitored, which is the strobe signal in this case. Accordingly, counter 204 can increment the counter value stored therein by one for every one-eighth of a clock cycle of the strobe signal that passes. It should be appreciated that while the strobe signal does not provide a constant reference signal, any reference to the frequency or clock period of the strobe signal refers to the frequency and/or clock period of the strobe signal when a valid reference signal is specified following the preamble, for example.

Detector controller 202 is also coupled to squelch circuit 270 via signal 208. Squelch circuit 270 is configured to squelch the strobe signal for a predetermined amount of time. For example, squelch circuit 270 can gate the strobe signal for an amount of time determined by the counter value from counter 204 as determined by controller 202. As noted, the strobe signal can be a DQS signal. Thus, squelch circuit 270 can pass a static value, whether configured to be a low static signal or a high static signal, to memory controller 120 while the strobe signal is gated.

Sampling FFs 210-224 can be clocked by clock signals 230-244 respectively. Clock signals 230-244 can be generated, or provided, by clock source 125. Sampling FFs 210-224 can output signals 250-264, respectively, to detector controller 202. Clock signals 230-244 can have approximately a same frequency as the strobe signal. While the frequency of each of clock signals 230-244 can be substantially the same or similar, the phase of each of clock signals 230-244 can be staggered or different.

For purposes of illustration, consider the phase of clock signal 230 to be a baseline phase from which the phase of each of clock signals 232-244 can be varied or adjusted. For example, denoting the phase of clock signal 230 to be "θ," the phase of clock signal 232 can be "θ+N," where N is a predetermined value. The phase of clock signal 234 can be "θ+2N." The phase of clock signals 236-244 can be "θ+3N," "θ+4N," "θ+5N," "θ+6N," and "θ+7N," respectively. In one or more embodiments, N can be selected to be an integer value. The value of N can be determined, for example, by dividing 360 degrees by the number of sampling FFs used to sample the strobe signal. Referring to FIG. 2, the value of N can be determined to be "360/8," which is 45 degrees. Accordingly, a phase variance of approximately 45 degrees exists between each of the clock signal pairs 230-232, 232-234, 234-236, 236-238, 238-240, 240-242, and 242-244.

Thus, sampling FF 212 captures the value of the strobe signal approximately one-eighth of the strobe signal clock cycle after sampling FF 210. Sampling FF 214 captures the value of the strobe signal approximately one-eighth of the strobe signal clock cycle after sampling FF 212, and so on. Detector controller 202, by monitoring each of signals 250-264 from sampling FFs 210-224, respectively, determines the state of the strobe signal at intervals of one-eighth of the clock cycle of the strobe signal, effectively achieving eight times oversampling of the strobe signal.

Within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

As pictured in FIG. 2, signal 226 can be generated from memory controller 120 and provided to memory 130. Signal 226 can be coupled to detector controller 202. Detector controller 202 can monitor signal 226 and detect when a read request is issued by memory controller 120 to memory 130. Responsive to detecting the read request on signal 226, detector controller 202 can start counter 204.

As discussed, the strobe signal is placed in a "high z state" or tri-stated until exercised by memory 130 when data is to be sent to memory controller 120. The strobe signal can be tri-stated, for example, up to the time when memory 130 sends the preamble. Detector controller 202 can, via sampling FFs 210-224, sample the strobe signal at varying times to detect the preamble and the first pulse following the preamble that is sent from memory 130 in response to the read request from memory controller 120.

Detector controller 202 can start counter 204 responsive to the read request on signal 226 and allow counter 204 to continue running, e.g., counting, until such time that a predetermined bit pattern is detected by sampling the strobe signal using sampling FFs 210-224 collectively. As shown, the strobe signal is provided as input to each of sampling FFs 210-224. In one or more embodiments, oversampling of the strobe signal can be initiated responsive to detecting the read request. In one or more other embodiments, however, oversampling of the strobe signal can be performed continually, with detector controller 202 ignoring sampled values of the strobe signal when a read request has not been detected from memory controller 120.

In any case, detector controller 202 can monitor the sampled values of the strobe signal via signals 250-264 for the occurrence of a predetermined bit pattern. For example, the predetermined bit pattern can be 000011, 0000011, 00000011, or the like. The particular bit pattern can vary according to the amount of oversampling achieved and the frequency of the strobe signal. The plurality of detected zero values followed by one or more one values indicates the detection of the rising edge of the first pulse immediately following the preamble within the strobe signal. Detector controller 202 can evaluate the values from each of signals 250-264 as a serial stream of bits. For example, detector controller 202 can read sampled bit values specified by signals 250, 252, 254, 256, 258, 260, 262, and 264 sequentially, and then repeat to form a continuous stream of sampled bit values.

Subsequent to the preamble, the strobe signal can begin oscillating, e.g., providing a reference signal. In one or more embodiments, the strobe signal, following the preamble, can have approximately a 50-50 duty cycle. Responsive to detecting the predetermined bit pattern, detector controller 202 can determine the counter value within counter 204 via signal 206. For example, counter 204 can be stopped responsive to detection of a rising edge of the strobe signal. The counter value can be read and stored within a register in detector controller 202. Detector controller 202 then can clear counter 204.

Recalling that the strobe signal is initially tri-stated prior to issuance of the read request, detector controller 202 can, in some cases, detect a false positive. More particularly, detector controller 202 can detect the predetermined bit pattern due to noise or a condition other than the occurrence of the first pulse following the preamble on the strobe signal. For example, since the strobe signal is initially in a high z state, the value sampled for the strobe signal can be random and result in a random pattern being detected within the stream of bits that can match the predetermined bit pattern.

To avoid a false positive, detector controller 202 oversamples the strobe signal and can monitor for the last detected instance or occurrence of the predetermined bit pattern prior to determining that the strobe signal has started oscillating as a valid reference signal. In general, once the strobe signal starts specifying a valid reference signal following the preamble, the duty cycle can be fixed, e.g., be 50-50. Detector controller 202 can distinguish the pattern generated from oversampling the strobe signal with a 50-50 duty cycle from the predetermined bit pattern indicative of the first pulse following the preamble. For example, a 50-50 duty cycle can be detected by detector controller 202 by recognizing that subsequent to the predetermined bit pattern, approximately four ones occur followed by approximately four zeros, with a repeating pattern of approximately four ones followed by four zeros corresponding to a 50-50 duty cycle reference signal.

The counter value determined by detector controller 202, as noted, can be stored for use in a subsequent read transaction. More particularly, the counter value can be stored within, or otherwise provided to, squelch circuit 270. Responsive to a next read request, detector controller 202 can instruct squelch circuit 270 to squelch the strobe signal for the amount of time specified by the counter value provided, e.g., the counter value determined responsive to the prior read request. Thus, the amount of time that the strobe signal is squelched, or gated, can be updated responsive to each read request. The updated amount of time, as specified by the counter value, can be used by the squelch circuit prospectively, i.e., responsive to a next read request.

Figure 3:
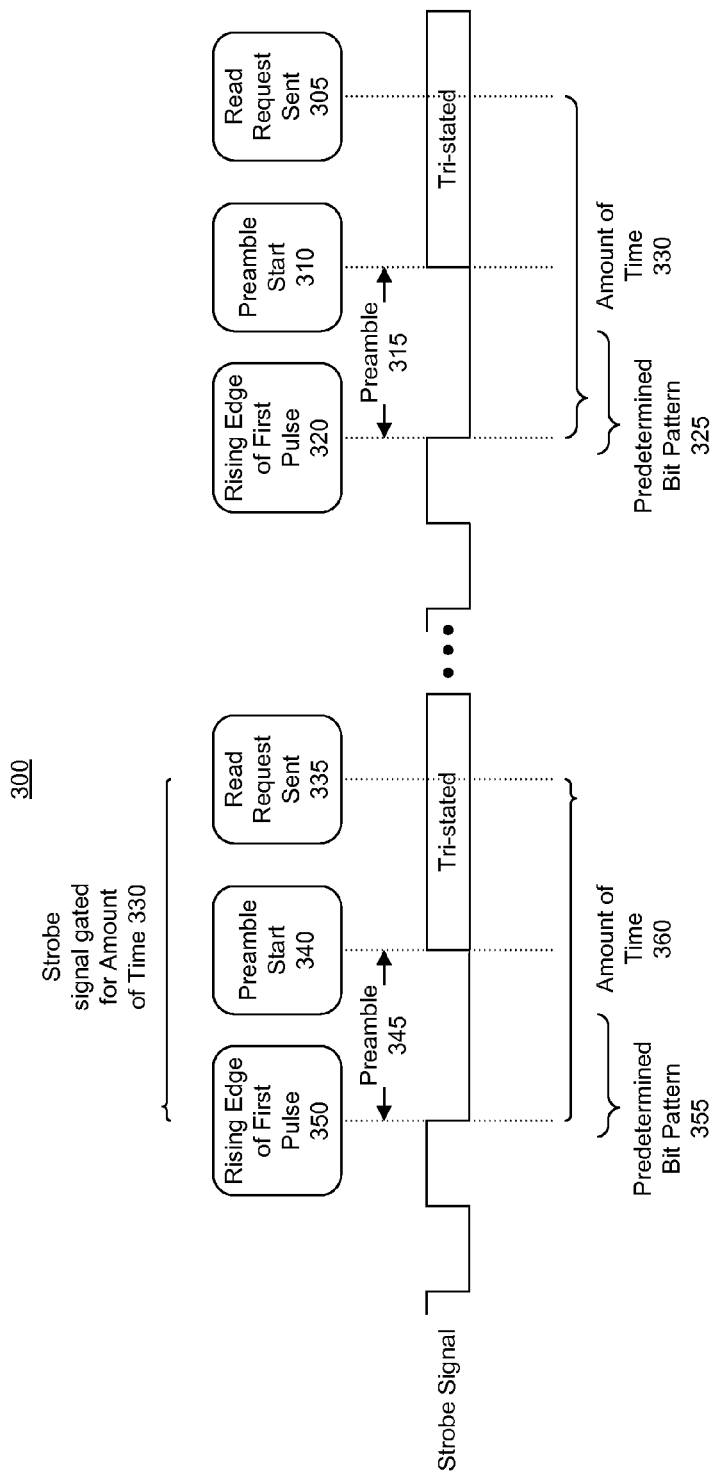
FIG. 3 is a signal diagram illustrating different states of a strobe signal that can be detected and/or measured in accordance with another embodiment of the present invention.

FIG. 3 is a signal diagram 300 illustrating different states of the strobe signal that can be detected and/or measured in accordance with another embodiment of the present invention. As shown, FIG. 3 illustrates that the strobe signal is initially tri-stated when a read request 305 is sent from the memory controller. The strobe detector starts the counter and sampling of the strobe signal. Responsive to receiving read request 305, the memory pulls the strobe signal low to specify preamble 315 as illustrated by preamble start 310. The rising edge of the first pulse 320 indicates the end of preamble 315. The strobe detector detects the rising edge of the first pulse 320 by observing a last instance or occurrence of the predetermined bit pattern 325 prior to observing the strobe signal transitioning from preamble 315 to approximately a 50-50 duty cycle. The strobe detector reads or otherwise determines the counter value responsive to detecting the rising edge of the first pulse 320 following preamble 315 to determine the amount of time 330.

Subsequent to the read operation, the strobe signal again is tri-stated and remains tri-stated when a subsequent read request 335 is sent from the memory controller. The strobe detector can again start the counter, which can be first reset, and sample the strobe signal. Responsive to receiving read request 335, the memory can pull the strobe signal low to specify preamble 345 as illustrated by preamble start 340. The rising edge of the first pulse 350 indicates the end of preamble 345. The strobe detector detects the rising edge of the first pulse 350 by observing a last instance or occurrence of the predetermined bit pattern 355 prior to observing the strobe signal transitioning from preamble 345 to approximately a 50-50 duty cycle. The strobe detector reads or otherwise determines the counter value responsive to detecting the rising edge of the first pulse 350 following preamble 345 to determine the amount of time 360 for use in gating or squelching the strobe signal responsive to a further read request (not shown).

As noted, the amount of time 330, as determined from the read request 305, is used to gate the strobe signal responsive to read request 335. The amount of time 330 is an approximation of the actual time that the strobe signal should be gated responsive to read request 335, i.e., amount of time 360. By continually updating the counter value responsive to each read request, variation in signal timing, e.g., drift in the strobe signal, due to voltage and temperature effects in the system can be reduced and/or minimized.

Figure 4:
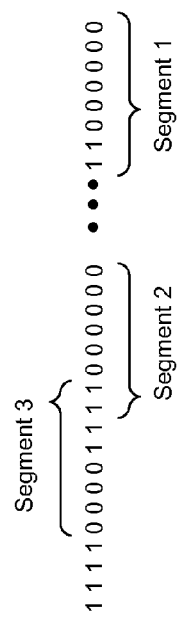
FIG. 4 is an example of a stream of bits determined by oversampling the strobe signal in accordance with another embodiment of the present invention.

FIG. 4 is an example of a stream of bits determined by oversampling the strobe signal in accordance with another embodiment of the present invention. FIG. 4 illustrates an example of different artifacts and state transitions that can be detected by the strobe detector as described with reference to FIGS. 1-3 of this specification.

Segment 1 illustrates an example of a false positive where the predetermined bit pattern is detected not in consequence of the rising edge of the first pulse following the preamble, but rather in consequence of noise, tri-stating of the strobe signal, or some other artifact that manifests itself on the strobe signal. Segment 2, which also corresponds to the predetermined bit pattern, does indicate the occurrence of the rising edge of the first pulse following the preamble on the strobe signal. Segment 2 can be distinguished from a false positive due to segment 3, which corresponds to a bit pattern that identifies a duty cycle of approximately 50-50, indicating that the strobe signal has transitioned to specifying a valid reference signal. Accordingly, the strobe detector determines that segment 2, being immediately followed by a bit pattern indicating a reference signal, is not a false positive as distinguished from segment 1.

Figure 5:
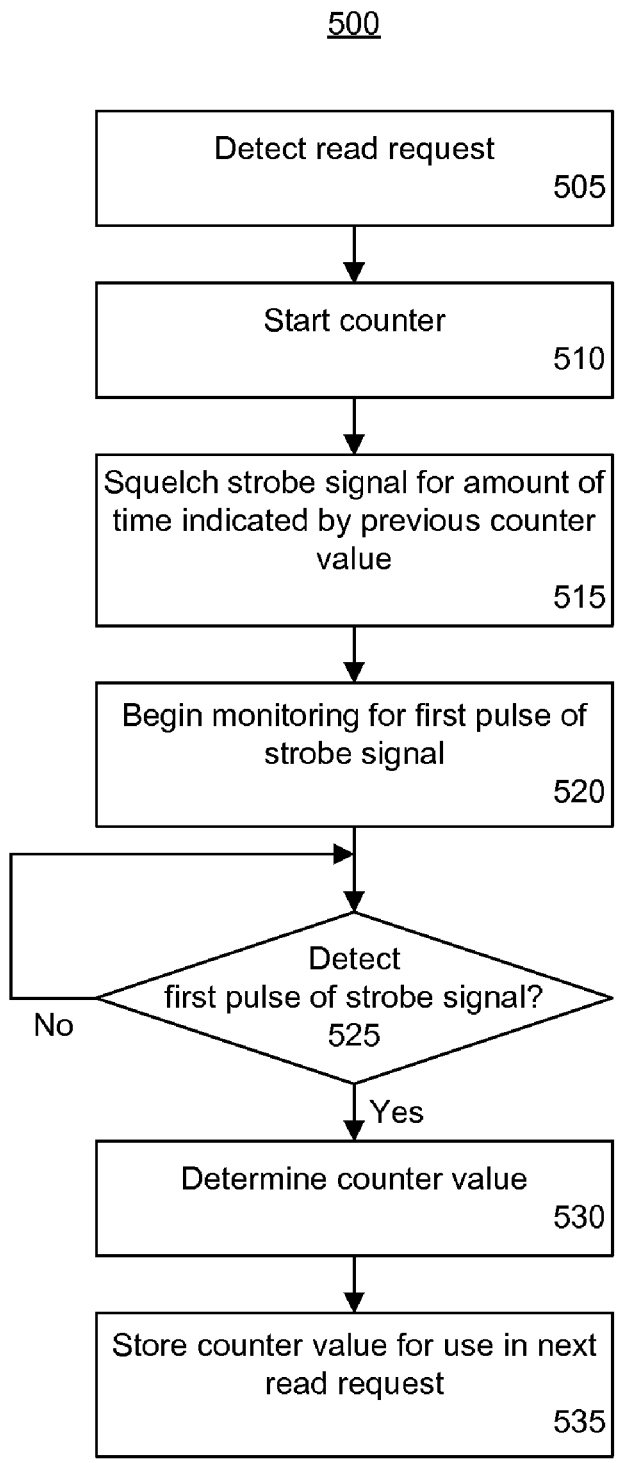
FIG. 5 is a flow chart illustrating a method of processing a strobe signal in accordance with another embodiment of the present invention.

FIG. 5 is a flow chart illustrating a method 500 of processing a strobe signal in accordance with another embodiment of the present invention. FIG. 5 can be implemented by the system illustrated with reference to FIGS. 1-4. Method 500 can begin in a state where the strobe signal is being oversampled as described within this specification. Accordingly, beginning in step 505, a read request can be detected by the strobe detector from the memory controller. As noted, the strobe detector can detect that the memory controller has sent or issued a read request to the memory.

In step 510, the strobe detector can start a counter. The counter can be started responsive to detection of the read request. In step 515, the strobe detector can squelch the strobe signal that is provided to the memory controller from the memory. The strobe detector can begin to squelch the strobe signal responsive to detection of the read request. While the strobe detector monitors for the occurrence of the first pulse on the strobe signal, the strobe detector squelches the strobe signal to prevent the strobe signal from being passed through to the memory controller while tri-stated and until a valid reference signal is specified by the strobe signal. The strobe detector can squelch the strobe signal for an amount of time specified by a previously stored, e.g., a prior, counter value.

In step 520, the phase detector can begin monitoring for the first pulse of the strobe signal. More particularly, the phase detector can begin monitoring for the rising edge of the first pulse following a preamble of the strobe signal that is sent from the memory. As discussed, in one aspect, the strobe detector can begin to oversample the strobe signal responsive to detecting the read request. In another aspect, the strobe detector can continually oversample the strobe signal. In any case, the strobe detector can begin to monitor for the occurrence of the predetermined bit pattern indicating the detection of the rising edge of the first pulse.

As discussed, the strobe detector can detect a last instance of the predetermined bit pattern prior to the strobe signal transitioning to specifying a valid reference signal. For example, responsive to each detection of the predetermined bit pattern, the counter value can be determined and stored. The counter value can be overwritten each time that the predetermine bit pattern is detected. When the strobe signal is determined by the strobe detector to have transitioned to specifying the reference signal, the last stored counter value can be used for purposes of specifying the squelch time for the subsequent or next read request. The counter then can be cleared.

In step 525, the strobe detector can determine whether the rising edge of the first pulse following the preamble has been detected. As noted, the rising edge of the first pulse is detected when the predetermined bit pattern is detected followed by a stream of bits indicating a reference signal with a predetermined duty cycle. When the rising edge of the first pulse is detected, method 500 can proceed to step 530. When the rising edge of the first pulse is not detected, method 500 can loop back to step 525 to continue monitoring for the occurrence of the first pulse following the preamble.

Continuing with step 530, the strobe detector can determine the counter value. For example, responsive to detecting the rising edge of the first pulse of the clock signal following the preamble as described, the counter value can be determined. In step 535, the strobe detector can store the counter value for use in squelching the strobe signal responsive to the next, e.g., a subsequent, read request from the memory controller. As discussed, the counter value indicates an amount of time between detection of a read request and the receipt of a first pulse following a preamble of the strobe signal sent by the memory in response to the read request.

One or more embodiments disclosed within this specification provide for dynamic detection of a strobe signal. By determining the timing relationship between a control signal, e.g., a read request, and a first pulse of a strobe signal, the time that the strobe signal is to be squelched or gated until a valid reference signal is specified by the strobe signal can be determined. The timing relationship can be determined responsive to subsequent read requests to account for timing variation in the strobe signal. Accordingly, the time that the strobe signal is gated can be updated to account for changes in the timing of the strobe signal that arise due to variations in temperature, voltage, and the like, over time.

The flowcharts in the figures illustrate the architecture, functionality, and operation of possible implementations of systems and methods according to various embodiments of the present invention. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A method of processing a strobe signal comprising:
oversampling a strobe signal received from a source synchronous device;
determining an amount of time between sending a read request to the source synchronous device and detecting a first pulse of the strobe signal according to the oversampling; and
squelching the strobe signal for the amount of time responsive to at least one subsequent read request.

2. The method of claim 1, further comprising:
sending the read request to the source synchronous device; and
detecting a rising edge of the first pulse that follows a preamble by the oversampling of the strobe signal.

3. The method of claim 2, wherein detecting a first pulse comprises:
detecting a predetermined bit pattern indicating the first pulse.

4. The method of claim 2, wherein detecting a first pulse comprises:
detecting a last occurrence of a predetermined bit pattern prior to determining that the strobe signal comprises a predetermined duty cycle.

5. The method of claim 1, wherein oversampling the strobe signal comprises:
providing the strobe signal to each of a plurality of sampling flip-flops; and
clocking each of the plurality of sampling flip-flops using a clock signal having a different phase and a frequency that is approximately equal to a frequency of the strobe signal.

6. The method of claim 1, wherein oversampling the strobe signal comprises:
providing the strobe signal to each of a plurality of sampling flip-flops; and
clocking each of the plurality of sampling flip-flops using a clock signal having a frequency that is approximately equal to a frequency of the strobe signal, wherein a phase of the clock signal provided to each of the plurality of sampling flip-flops increases by a phase variance of approximately 360 divided by a number of the plurality of sampling flip-flops.

7. The method of claim 6, further comprising selecting the number of the plurality of sampling flip-flops to result in an integer value phase variance.

8. The method of claim 1, further comprising determining an updated amount of time between sending a read request and detecting a first pulse of the strobe signal responsive to at least one subsequent read request.

9. A system for processing a strobe signal comprising:
a plurality of sampling flip-flops oversampling the strobe signal, wherein each of the plurality of sampling flip-flops is clocked by a clock signal having a different phase and approximately a same frequency as a frequency of the strobe signal;
a controller configured to detect a read request sent to a source synchronous device and determine an amount of time between the read request and a first pulse of the strobe signal according to values received from the plurality of sampling flip-flops oversampling the strobe signal; and
a squelch circuit configured to gate the strobe signal for the amount of time responsive to a subsequent read request.

10. The system of claim 9, further comprising:
a counter coupled to the controller, wherein the controller starts the counter responsive to the read request and determines a count of the counter responsive to detecting the first pulse of the strobe signal.

11. The system of claim 9, wherein the controller is configured to detect a rising edge of the first pulse following a preamble of the strobe signal.

12. The system of claim 11, wherein the controller is configured to detect the rising edge of the first pulse by detecting a predetermined bit pattern from the oversampling.

13. The system of claim 12, wherein the controller is configured to detect the rising edge of the first pulse by detecting a last instance of a predetermined bit pattern from the oversampling prior to detecting that the strobe signal has a predetermined duty cycle.

14. The system of claim 9, wherein each of the plurality of sampling flip-flops is clocked by a clock signal having a frequency that is approximately equal to a frequency of the strobe signal, wherein a phase of the clock signal provided to each of the plurality of sampling flip-flops increases by a phase variance of approximately 360 divided by a number of the plurality of sampling flip-flops.

15. The system of claim 14, wherein the number of the plurality of sampling flip-flops results in an integer value phase variance.

16. A system comprising:
a memory controller; and
a strobe detector coupled to the memory controller,
wherein the strobe detector is configured to determine an amount of time between sending a read request originating from the memory controller to a source synchronous device and detecting a first pulse of a strobe signal received from the source synchronous device, wherein the strobe detector is configured to gate the strobe signal responsive to at least one subsequent read request from the memory controller for the amount of time.

17. The system of claim 16, wherein the strobe detector further comprises:
a plurality of sampling flip-flops oversampling the strobe signal, wherein each of the plurality of sampling flip-flops is clocked by a clock signal having a different phase and approximately a same frequency as a frequency of the strobe signal.

18. The system of claim 17, wherein the phase of the clock signal provided to each of the plurality of sampling flip-flops increases by a phase variance of approximately 360 divided by a number of the plurality of sampling flip-flops.

19. The system of claim 17, wherein the strobe detector further comprises:
a controller configured to detect the first pulse of the strobe signal by detecting a predetermined pattern of values received from each of the plurality of sampling flip-flops oversampling the strobe signal; and
a counter coupled to the controller, wherein the controller starts the counter responsive to the read request and determines a count of the counter responsive to detecting the first pulse of the strobe signal.

20. The system of claim 16, wherein the strobe detector further comprises:
a counter configured to start counting responsive to the read request and to determine a count indicating the amount of time responsive to detecting the first pulse of the strobe signal.

* * * * *